United States Patent
Taite et al.

(10) Patent No.: US 9,671,772 B2
(45) Date of Patent: Jun. 6, 2017

(54) CONTEXTUAL CLOTHING SYSTEM

(71) Applicant: Intel Corporation, Santa Clara, CA (US)

(72) Inventors: Shahar Taite, Kfar Saba (IL); Tomer Rider, Naahryia (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/863,743

(22) Filed: Sep. 24, 2015

(65) Prior Publication Data

US 2017/0090450 A1    Mar. 30, 2017

(51) Int. Cl.
G06F 7/00 (2006.01)
G05B 19/10 (2006.01)
A47B 61/00 (2006.01)

(52) U.S. Cl.
CPC .............. *G05B 19/10* (2013.01); *A47B 61/00* (2013.01); *G05B 2219/31034* (2013.01)

(58) Field of Classification Search
None
See application file for complete search history.

(56) References Cited

U.S. PATENT DOCUMENTS

| 7,321,984 B2* | 1/2008 | Fu ......................... G06Q 90/00 714/5.1 |
| 2002/0121980 A1* | 9/2002 | Wan et al. ........... G06Q 10/087 340/572.1 |

\* cited by examiner

*Primary Examiner* — Yolanda Cumbess
(74) *Attorney, Agent, or Firm* — Grossman, Tucker, Perreault & Pfleger, PLLC

(57) ABSTRACT

One embodiment provides an apparatus. The apparatus includes a contextual clothing controller. The contextual clothing controller includes clothing selection logic. The clothing selection logic is to identify a clothing article based, at least in part, on a predicted target clothing characteristic. The clothing selection logic is further to determine a location of the identified clothing article in a storage system.

14 Claims, 3 Drawing Sheets

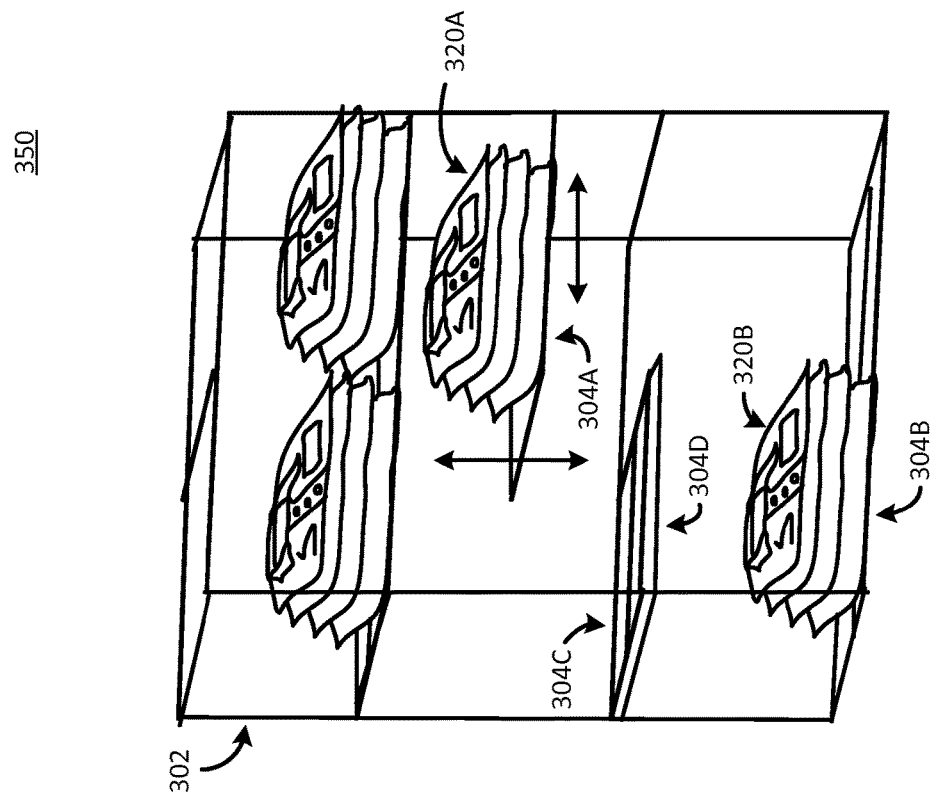
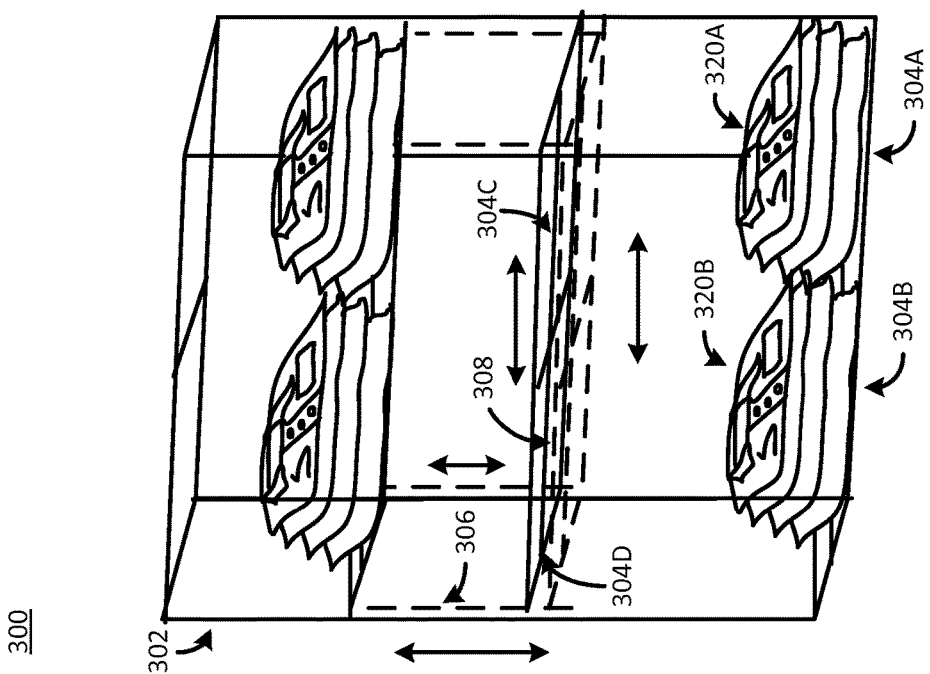

CONTEXTUAL CLOTHING SYSTEM

FIELD

The present disclosure relates to a clothing system, in particular to, a contextual clothing system.

BACKGROUND

Selecting one's attire each day from a closet that contains a number of clothing articles can be time-consuming. A user may consider a number of factors when selecting an article of clothing. For example, the user may consider anticipated activity, environmental factors, as well as one or more intangible factors such as mood. Environmental factors may include, for example, season (spring, summer, fall, winter) and/or weather forecast, if known. Determining the weather forecast, for example, increases user effort in making the clothing selection.

Typically, only a portion of the clothing articles contained in the closet may be viewable by the user and/or within the user's reach at any given point in time. When the user is selecting attire, the user may see only a portion of the clothing articles contained in the closet. At least some users may or may not remember all of the clothing that is contained in the closet. Thus, the user may or may not make an optimum clothing choice based on the visible clothing articles and/or the user's memory.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 3A and 3B illustrate example systems including a storage system consistent with one embodiment of the present disclosure.

Figure 1:
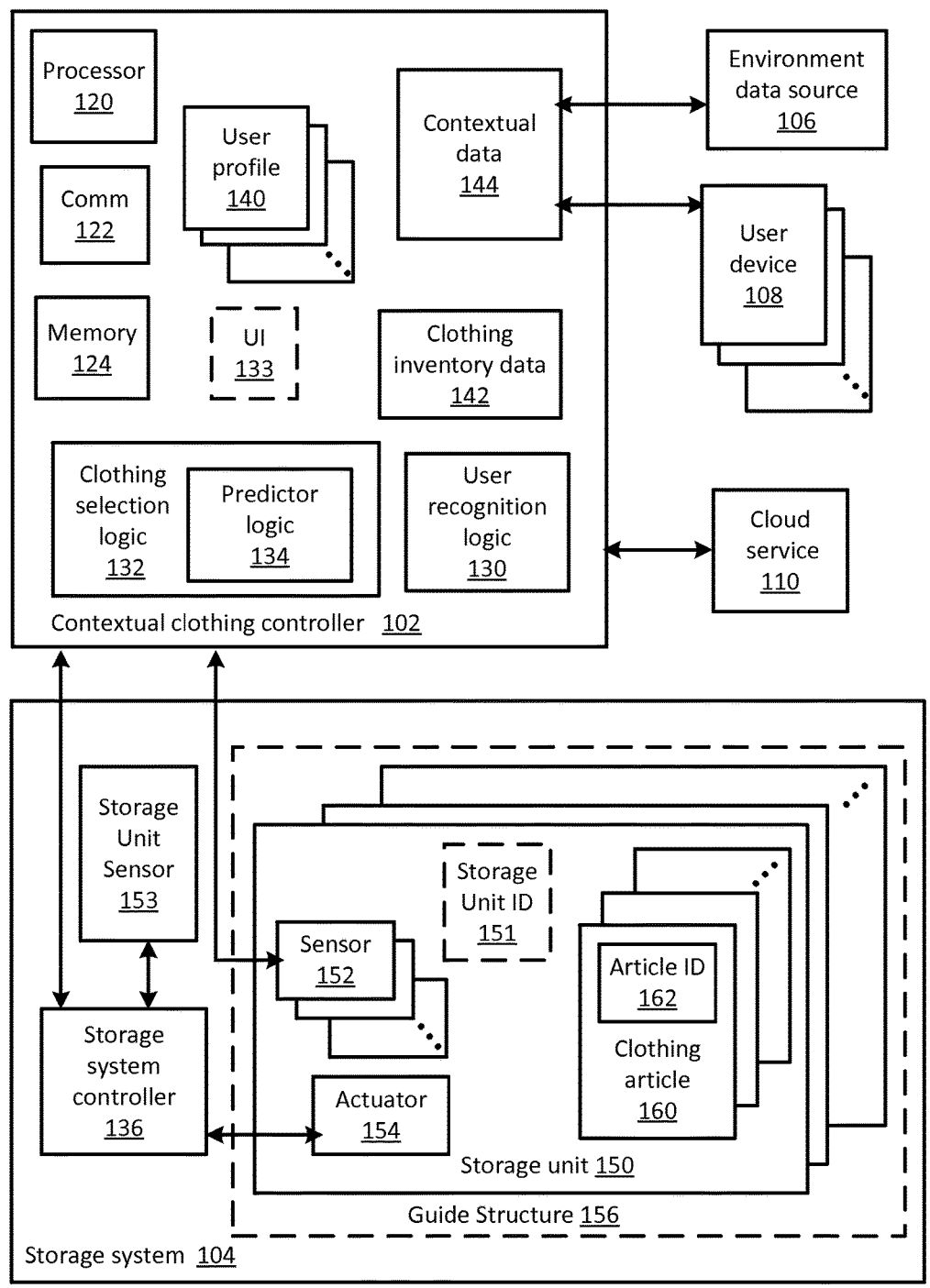
FIG. 1 illustrates a functional block diagram of a system, including a contextual clothing system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Clothing articles (i.e., articles of clothing) may be classified by a number of clothing characteristics (i.e., clothing characteristic data) including, but not limited to, article type, article kind, fabric weight, fabric type, season (i.e. winter, spring, summer, fall), wear history, etc. Article type may include, but is not limited to, blouse, shirt, pants, trousers, skirt, shorts, dress, outerwear, underwear, etc. Article kind may include, but is not limited to, casual wear, leisure wear, evening wear, business attire, dress wear, work wear, formal wear, etc. Fabric weight may include, but is not limited to, lightweight, medium weight and heavyweight. Fabric type may include, but is not limited to, natural fabric material (e.g., wool, cotton), synthetic fabric material (e.g., polyester, nylon, spandex, etc.), and/or combinations thereof. Fabric weight and/or fabric type may be related to season. For example, clothing articles of light weight cotton fabric may be selected during the summer when the weather forecast is for sunshine. Wear history may include, but is not limited to, purchase date, number of times worn, etc.

Clothing articles contained in the clothes closet may or may not be arranged according to one or more of the clothing characteristics. For example, some clothing articles may be grouped according to season. In another example some clothing articles may be grouped according to article kind. A user may or may not arrange the clothing articles when placing them in the closet.

Thus, determining and/or selecting a target clothing article and then finding the target clothing article in a closet can be a challenge.

Generally, this disclosure relates to a contextual clothing system. An apparatus, method and/or system are configured to identify a clothing article based, at least in part, on a predicted target clothing characteristic. The target clothing characteristic may be predicted based, at least in part, on contextual data and/or based, at least in part, on user profile data. The apparatus, method and/or system may then determine a location of the identified clothing article in a closet that includes a storage system and command a storage system controller to position the identified article in proximity to the user. Contextual data may include, but is not limited to, environmental data (e.g., season, weather forecast, geographic location, etc.), a user's calendar and/or schedule, and/or recommendation(s) from an intelligent personal digital assistant, etc. A user profile may include user-specific data (e.g., age, sex, etc.), and/or historical data related to past clothing selections. For example, the historical data may include machine learning-related information, as described herein. The storage system may include one or more movable storage units and each storage unit may be configured to store one or more clothing articles.

Thus, clothing articles appropriate to the context and/or that correspond to the user profile may be provided to the user. The user may select an identified clothing article, may select from a plurality of identified clothing articles and/or may make a manual selection, as described herein. The selection of attire may thus be facilitated and the user's experience may be enhanced.

FIG. 1 illustrates a functional block diagram of a system 100 consistent with several embodiments of the present disclosure. The system 100 includes a contextual clothing controller 102, a storage system 104, an environment data source 106, one or more user devices, e.g., user device 108, and a cloud service 110.

The storage system 104 includes a storage system controller 136 and a plurality of storage units, e.g., storage unit 150. Storage system 104 may include a storage unit sensor 153. Each storage unit, e.g., storage unit 150, may include an associated storage unit identifier 151. Storage unit sensor 153 may be configured to sense a position of storage unit 150 using storage unit identifier 151.

Each storage unit, e.g., storage unit 150, includes one or more sensors, e.g., sensor 152, and an actuator 154. Storage unit 150 is configured to store, i.e., contain, one or more clothing articles, e.g., clothing article 160. A storage unit, e.g., storage unit 150, may contain a plurality of clothing articles that share one or more common clothing characteristics. For example, some clothing articles may be grouped according to season. In another example some clothing articles may be grouped according to article kind. Such groupings may facilitate positioning a plurality of clothing articles in proximity to a user that correspond to at least some predicted target clothing characteristics, as described herein.

Storage unit 150 may be movable. Storage unit 150 may include, but is not limited to, a shelf, a portion of a shelf, a container, a clothing rack configured to carry clothing articles on hangers, a portion of a clothing rack, etc. In other words, storage unit 150 corresponds to any apparatus configured to store clothing articles and that may be movable. Actuator 154 is configured to move storage unit 150, i.e., to adjust a position of the storage unit 150. For example, actuator 154 may be configured to cause storage unit 150 to translate (i.e., to move in a straight line), rotate and/or a combination thereof. The translation motion may be vertical, horizontal and/or a combination thereof. Actuator 154 may include, but is not limited to, an electric motor, an electromechanical rack, a pneumatic actuator, a robot, etc.

Storage system 104 may include a guide structure 156 configured to guide and/or support one or more storage unit(s), e.g., storage unit 150. Guide structure 156 may include, but is not limited to, a frame, one or more guide rail(s), a clothing rack, etc. In an embodiment, actuator 154 may be configured to move the storage unit 150 within the guide structure 156. In another embodiment, actuator 154 may be configured to remove the storage unit 150 from the guide structure 156 for positioning in proximity to the user. In this embodiment, the actuator 154 may then be configured to return the storage unit 150 to the guide structure 156.

Storage system controller 136 is configured to control actuator 154 in order to adjust a position (i.e., move) storage unit 150. Storage system controller 136 may control actuator 154 in response to one or more commands from contextual clothing controller 102, as described herein. Storage system controller 136 may include, but is not limited to, a microprocessor, a microcontroller, an application specific integrated circuit (ASIC), application specific instruction processor (ASIP), etc.

Sensor 152 is configured to detect the presence and/or position of one or more clothing articles, e.g., clothing article 160, in or on storage unit 150. Presence corresponds to whether or not a clothing article is present in or on storage unit 150. Position corresponds to position in or on storage unit 150. For example, a plurality of clothing articles may be stacked in or on storage unit 150, thus, a height of an identified clothing article may vary with position in or on storage unit 150. Each sensor 152 may be associated with a corresponding storage unit identifier 151. Thus, presents data may be associated with a selected storage unit and corresponding storage unit identifier 151. The storage unit identifier 151 is configured to facilitate monitoring a position of the associated storage unit 150.

Sensor 152 may be further configured to identify each article of clothing, e.g., clothing article 160, stored by storage unit 150. Thus, clothing article 160 may include an article identifier (ID) 162. The article ID 162 is configured to uniquely identify the associated clothing article 160. For example, the article ID 162 may be an RFID (radio frequency identifier) tag configured to store a unique identifier. Sensor 152 and/or storage system controller 136 may then include an RFID reader. In another example, sensor 152 may include a pressure sensor configured to detect and/or measure an amount of clothing articles included in or on storage unit 150. In another example, sensor 152 may include a camera configured to capture an image of clothing article(s) included in or on storage unit 150. In another example, sensor 152 may include a light emitting diode (LED) and a photodetector, e.g., photodiode, configured to detect an amount (e.g., height) of clothing articles contained by the storage unit 150. Clothing article presence and/or identification information may be captured by contextual clothing controller 102. In other words, contextual clothing controller 102 may be configured to capture sensor data from sensor 152.

In some embodiments, each storage unit, e.g., storage unit 150, may include a plurality of sensors 152. The plurality of sensors may be configured to provide relatively more accurate sensing than one sensor alone. For example, a combination of a pressure sensor and an RFID reader may be configured to first provide an indication whether a storage unit is occupied, using the pressure sensor, and to secondly identify the clothing articles included in or on the storage unit based on detected RFID tags.

Contextual clothing controller 102 includes a processor 120, a communication interface 122 and memory 124. Contextual clothing controller 102 further includes user recognition logic 130 and clothing selection logic 132. Clothing selection logic 132 may include predictor logic 134. Contextual clothing controller 102 further includes one or more user profiles, e.g., user profile 140 and clothing inventory data 142. Contextual clothing controller 102 may include contextual data 144.

Processor 120 may include, but is not limited to, a microprocessor, a microcontroller, an application specific integrated circuit (ASIC), application specific instruction processor (ASIP), etc. Communication interface 122 may comply and/or be compatible with one or more, wired and/or wireless, communication protocols. Communication interface 122 is configured to couple contextual clothing controller 102 to one or more of the environment data source 106, one or more user devices, e.g., user device 108, cloud service 110 and/or storage system controller 136. Memory 124 is configured to store user profile 140, clothing inventory data 142 and contextual data 144.

Contextual clothing controller 102 may include a user interface (UI) 133. UI 133 may include a key pad, keyboard, touch pad, mouse, display (including a touch sensitive display) configured to receive user input and/or to output, i.e., display, information to the user. For example, UI 133 may be utilized for manual operations, as described herein.

Environment data source 106 is configured to provide environmental data to contextual clothing controller 102. Environment data source 106 may include, but is not limited to, a web service, a weather app, a home automation system including, e.g., intelligent sensors, etc. Environmental data may include, but is not limited to, a weather forecast, a temperature and/or humidity level. For example, the weather forecast may be provided by a web service and/or a weather app. In another example, the temperature and/or humidity level may be provided by one or more intelligent sensor(s). Environmental data may be stored to contextual data 144.

User device 108, may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. User device 108 may be configured to store a calendar, e.g., a user's engagement calendar, a social network app and/or social network-related information, one or more apps, e.g., a weather app, etc. User device 108 and/or information stored on and/or retrievable by user device 108 may be utilized as a source of contextual data, as described herein.

Cloud service 110 may include a plurality of computing systems, e.g., servers. Cloud service 110 is configured to provide computing capability to contextual clothing controller 102. For example, cloud service 110 may be configured to execute predictor logic 134, as described herein. In other words, cloud service 110 may be configured to provide relatively more processing capability than may be available from processor 120.

Contextual clothing controller 102 is configured to identify one or more clothing articles based, at least in part, on a predicted target clothing characteristic. The target clothing characteristic may be predicted based, at least in part, on contextual data, and/or based, at least in part, on user profile data. Contextual clothing controller 102 is further configured to command storage system controller 136 to move a storage unit, e.g., storage unit 150, to a location in proximity of the user. The storage unit 150 is configured to contain one or more identified clothing article(s).

Contextual clothing controller 102, e.g., user recognition logic 130, is configured to identify a user based, at least in part, on one or more user identifiers. In one example the user may be identified based, at least in part, on proximity of a user device, e.g., a cellular telephone. In another example, user identifiers may include one or more biometric parameters, a unique user password, etc. Biometric parameters include, but are not limited to facial feature(s), voice feature(s), fingerprint, retina scan, electrophysiological characteristics, etc. Thus, user recognition logic 130 may be configured to perform face recognition, voice recognition, fingerprint recognition, etc.

User profile data associated with the identified user may then be retrieved from user profile 140 by clothing selection logic 132 and/or predictor logic 134. The user profile 140 may be selected from a plurality of user profiles based, at least in part, on the user identifier. The user profile 140 is configured to store user data, i.e., user-specific information, for each user. The user data may include, but is not limited to, a listing of user device identifiers, a history of past clothing selections related to contextual data, a history of past clothing selections related to accuracy of predictions, age of the user, sex of the user, etc. The history of past clothing selections related to contextual data and/or accuracy of predictions, is configured to facilitate machine learning to improve selection accuracy over time. User data may further include user preferences. For example, user preferences may relate contextual data, e.g., type of weather, to a user's clothing preferences. In another example, user preferences may include preferred number of identified clothing articles to be positioned in proximity to the user.

Contextual data 144 may then be captured by clothing selection logic 132 and/or predictor logic 134. For example, contextual data 144 may include environmental data retrieved from environment data source 106 and/or user-specific data captured from user device 108. User specific data may include, but is not limited to, the user schedule, an indication of an upcoming event (e.g., a concert, a play, social gathering, business activity, etc.), an indication of the user's mood from the intelligent personal digital assistant, etc.

Target clothing characteristics may then be predicted by predictor logic 134 based, at least in part, on captured contextual data. Predictor logic 134 may be further configured to predict target clothing characteristics based, at least in part, on user profile data. Target clothing characteristics may thus be related to the captured contextual data and/or user profile data. For example, target clothing characteristics may correspond to a best match of clothing characteristics to the captured contextual data and/or user profile data. Predictor logic 134 may be configured to implement one or more machine learning techniques to predict the target clothing characteristics. Machine learning generally includes creating models from example input data and then making predictions based, at least in part, on target input data using the models. Machine learning techniques may include, but are not limited to, decision tree learning, association rule learning, artificial neural networks, inductive logic programming, support vector machines, clustering, Bayesian networks, reinforcement learning, representation learning, similarity in metric learning, etc. Such machine learning techniques may be relatively computationally intensive. Thus, predictor logic 134 may be configured to utilize cloud service 110 for clothing characteristics prediction operations.

One or more clothing articles may then be identified. For example, clothing selection logic 132 may be configured to receive target clothing characteristics predictions from predictor logic 134. Clothing selection logic 132 may then be configured to access clothing inventory data 142 in order to identify clothing articles that have at least some of the predicted target clothing characteristics. In another example, predictor logic 134 may be configured to predict target clothing characteristics and to identify corresponding clothing articles using clothing inventory data 142. In another example, predictor logic 134 may be configured to predict one or more target clothing identifiers using machine learning techniques and clothing inventory data 142.

Clothing inventory data 142 may include clothing characteristic data indexed by, for example, clothing article identifiers, e.g., article identifier 162. Clothing selection logic 132 is configured to identify one or more clothing articles whose associated clothing characteristic data corresponds to the predicted target clothing characteristics. For example, a clothing article identifier may be selected when at least a portion of the associated clothing characteristic data matches at least a portion of the predicted target clothing characteristics. The portion may correspond to a match threshold that may be adjustable, set by a user, and stored in user profile 140. Thus, an exact match is not required.

A location of each identified clothing article may then be determined. For example, clothing selection logic 132 may be configured to determine a respective location for each clothing identifier. For example, clothing selection logic 132 may be configured to read one or more of sensors 152 in order to determine the respective locations. In another example, clothing inventory data 142 may include location information. The location information may have been previously stored by clothing selection logic 132 to clothing inventory data 142 for storage. Clothing selection logic 132 may then be configured to access clothing inventory data 142 to determine the location of the selected identified articles. Continuing with this example, clothing selection logic 132 may then provide the location information to storage system controller 136.

The identified clothing articles may then be positioned in proximity to the user. For example, clothing selection logic 132 may command storage system controller 136 to position the identified clothing article(s) in proximity to the user. Storage system controller 136 may be configured to control and/or drive actuators 154 to move a selected storage unit, e.g., storage unit 150, to a location in proximity to the user.

The user may then select or not select one or more of the identified clothing articles from the storage unit 150.

Storage system controller 136 and/or clothing selection logic 132 may be configured to monitor whether or not the identified clothing articles are selected by the user. For example, sensor 152 may be monitored for a change in, e.g., detected pressure. In another example, clothing selection logic 132 and/or an associated RFID reader may no longer detect the presence (i.e., may detect the absence) of an RFID tag associated with an identified clothing article.

Clothing selection logic 132 may be further configured to update the user profile 140 based, at least in part, on a result of the monitoring. In this manner, the user profile 140 may be configured to support the learning technique utilized by predictor logic 134. If the user does not select one of the identified clothing articles, the user may be provided an option to manually select desired clothing articles and/or storage unit, e.g., storage unit 150, or to repeat the contextual clothing selection. For example, the user may be provided a query by clothing selection logic 132. The query may be provided to a user device 108 and/or to a user interface 133. The user may then utilize user device 108 and/or the user interface 133 to provide the response to the query. If the user selects the manual option, the user may be requested by clothing selection logic 132 to input an article identifier and/or the storage unit identifier that corresponds to the user's clothing article selection. Clothing selection logic 132 may then commands storage system controller 136 to position the identified clothing articles and or the identified storage unit in proximity to the user.

Thus, clothing articles appropriate to the context may be provided to the user. The user may select an identified clothing article, may select from a plurality of identified clothing articles and/or may make a manual selection, as described herein. The selection of attire may thus be facilitated and the user's experience may be enhanced.

Figure 2:
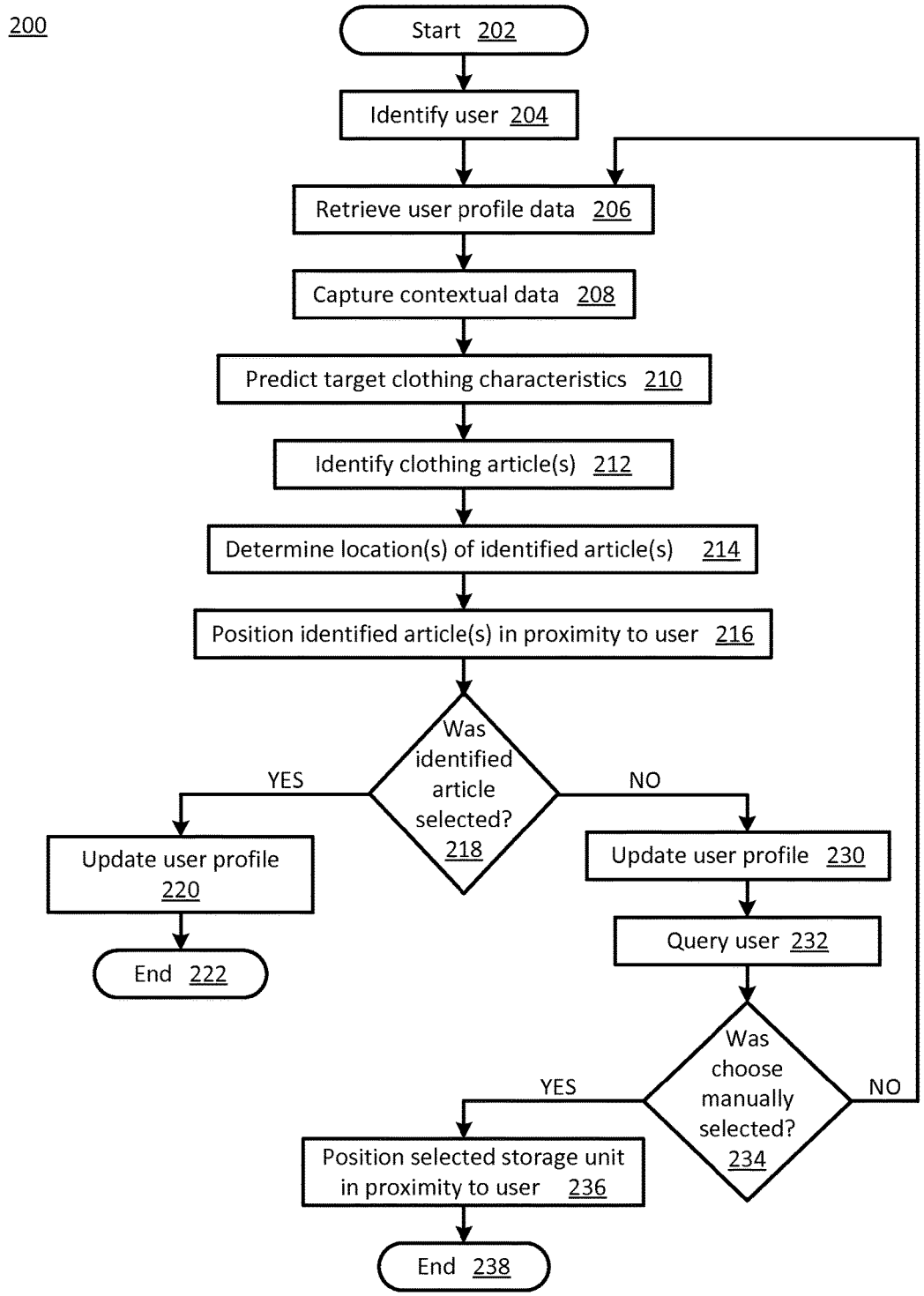
FIG. 2 is a flowchart of contextual clothing selection operations according to various embodiments of the present disclosure.

FIG. 2 is a flowchart 200 of contextual clothing selection operations according to various embodiments of the present disclosure. In particular, the flowchart 200 illustrates predicting target clothing characteristics based, at least in part, on contextual data and/or based, at least in part, on user profile data. The operations may be performed, for example, by contextual clothing controller 102, e.g., user recognition logic 130, predictor logic 134, clothing selection logic 132, and/or storage system controller 136 of FIG. 1.

Operations of this embodiment may begin with start 202. A user may be identified at operation 204. For example, the user may be identified based on proximity of a user device. In another example, the user may be identified, e.g., recognized, based, at least in part, on one or more biometric characteristics. User profile data may be retrieved at operation 206. For example, user profile data may be retrieved from a selected user profile that corresponds to the identified user. Contextual data may be captured at operation 208. For example, contextual data may be captured from user device(s) and/or a web service (e.g., weather forecast). Target clothing characteristics may be predicted at operation 210. For example, target clothing characteristics may be predicted using one or more machine learning techniques. Clothing articles may be identified at operation 212. For example, clothing articles may be identified based, at least in part, on predicted target characteristics and based, at least in part, on clothing characteristics in a clothing inventory. Locations of the identified clothing articles may be determined at operation 214. The identified articles may be positioned in proximity to the user at operation 216. For example, a storage system controller may be commanded by a contextual clothing controller to position the identified clothing articles. Whether an identified article was selected by the user may be determined at operation 218. If the identified article was selected, the user profile may be updated at operation 220. Program flow may then end at operation 222. If the identified article was not selected by the user, then the user profile may be updated at operation 230. Updating the user profile at operation 220 or operation 230 is configured to facilitate machine learning, as described herein.

The user may then be queried at operation 232. Whether the user chose manually selecting clothing articles may be determined at operation 234. If the user did not choose manual clothing article selection, then program flow may proceed to operation 206. If the user chose manual clothing selection, then a selected storage unit may be positioned in proximity to the user at operation 236. Program flow may then ended operation 238.

Thus, target clothing characteristics may be predicted based, at least in part, on contextual data and/or based, at least in part, on user profile data. A clothing article may be identified based, at least in part, on the predicted target clothing characteristics. A location of the identified clothing article in a closet (i.e., storage system) may then be determined and a storage system controller may be commanded to position the identified article in proximity to the user.

While the flowchart of FIG. 2 illustrates operations according various embodiments, it is to be understood that not all of the operations depicted in FIG. 2 is necessary for other embodiments. In addition, it is fully contemplated herein that in other embodiments of the present disclosure, the operations depicted in FIG. 2 and/or other operations described herein may be combined in a manner not specifically shown in any of the drawings, and such embodiments may include less or more operations than are illustrated in FIG. 2. Thus, claims directed to features and/or operations that are not exactly shown in one drawing are deemed within the scope and content of the present disclosure.

FIGS. 3A and 3B illustrate example systems 300, 350 including a storage system 302 consistent with one embodiment of the present disclosure. FIGS. 3A and 3B may be best understood when considered together. Example system 300 illustrates the storage system 302 prior to prediction of target clothing characteristics, identification of clothing articles and positioning of the identified articles in proximity to a user. Example system 350 illustrates the storage system 302 after prediction of target clothing characteristics, identification of clothing articles and positioning of the identified articles in proximity to the user.

Storage system 302 includes a plurality of storage units, e.g., storage units 304A, 304B, 304C, 304D. In this example, the storage units 304A, 304B, 304C, 304D correspond to shelves, e.g., closet shelves. Storage system 302 further includes a plurality of mechanical rails 306, 308. The mechanical rails 306, 308 are examples of guide structure 156 of FIG. 1. The mechanical rails 306, 308 correspond to guide rails, i.e., mechanical tracks, configured to guide the motion of the storage units, i.e., movable shelves. Thus, the movable shelves 304A, 304B, 304C, 304D are configured for translation motion, i.e., motion in a straight line. The movable shelves 304A, 304B, 304C, 304D may move vertically and/or horizontally. A subset of the movable shelves each contains a plurality of clothing articles, e.g., clothing articles 320A that are on shelf 304A and clothing articles 320B that are on shelf 304B.

Turning now to example system 300, shelves 304A, 304B are positioned at the bottom of storage system 302 and shelves 304C and 304D, that do not include clothing articles, are positioned near the middle of storage system 302. Shelves 304C, 304D may move, i.e., translate, horizontally and/or vertically along the mechanical rails 306, 308. Turning now to example system 350, clothing articles 320A have been identified and positioned in proximity to a user (not shown). In order to allow shelf 304A and clothing articles 320A to move vertically, shelf 304C has moved horizontally on top of shelf 304D, creating an opening for shelf 304A. Shelf 304A and clothing articles 320A have been moved vertically to a position in proximity to a user.

Thus, example systems 300, 350, including storage system 302, illustrate one electromechanical system configured to allow positioning identified clothing articles in proximity to a user, as described herein.

Thus, clothing articles appropriate to the context may be provided to the user. The user may select an identified clothing article, may select from a plurality of identified clothing articles and/or may make a manual selection, as described herein. The selection of attire may thus be facilitated and the user's experience may be enhanced.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., contextual clothing controller 102 and/or user device 108. For example, the OS may be implemented using Microsoft® Windows®, HP-UX®, Linux®, or UNIX®, although other operating systems may be used. In another example, the OS may be implemented using Android™, iOS, Windows Phone® or BlackBerry®.

Memory 124 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Sensor 152 and/or storage system controller 136 may be configured to read storage unit ID 151 and/or article ID 162. Sensor 152, storage system controller 136, storage unit ID 151 and/or article ID 162 may comply and/or be compatible with one or more RFID-related specifications. For example, sensor 152, storage system controller 136, storage unit ID 151 and/or article ID 162 may comply and/or be compatible with one or more of International Organization for Standardization/International Electrotechnical Commission standard ISO/IEC 14443-1:2008, title: Identification cards—Contactless integrated circuit cards—Proximity cards—Part 1: Physical characteristics, published Jun. 15, 2008 and reviewed in 2013; ISO/IEC 14443-2:2010, title: Identification cards—Contactless integrated circuit cards—Proximity cards—Part 2: Radio frequency power and signal interface, published Sep. 1, 2010; ISO/IEC 14443-3:2011, title: Identification cards—Contactless integrated circuit cards—Proximity cards—Part 3: Initialization and anticollision, published Apr. 15, 2011; and/or ISO/IEC 14443-4:2008, title: Identification cards—Contactless integrated circuit cards—Proximity cards—Part 4: Transmission protocol, published Jul. 15, 2008, reviewed in 2014, and/or later and/or related versions of these standards.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, clothing articles appropriate to the context may be provided to the user. The user may select an identified clothing article, may select from a plurality of identified clothing articles and/or may make a manual selection, as described herein. The selection of attire may thus be facilitated and the user's experience may be enhanced.

EXAMPLES

Examples of the present disclosure include subject material such as a method, means for performing acts of the method, a device, or of an apparatus or system related to a contextual clothing system, as discussed below.

Example 1

According to this example there is provided an apparatus. The apparatus includes a contextual clothing controller. The contextual clothing controller includes clothing selection logic. The clothing selection logic is to identify a clothing article based, at least in part, on a predicted target clothing characteristic and to determine a location of the identified clothing article in a storage system.

Example 2

This example includes the elements of example 1, wherein the contextual clothing controller further includes predictor logic, the predictor logic to predict the target clothing characteristic.

Example 3

This example includes the elements of example 1, wherein at least one of the predicted target clothing characteristic is predicted based, at least in part, on contextual data and/or the predicted target clothing characteristic is predicted based, at least in part, on user profile data.

Example 4

This example includes the elements of example 1, wherein the contextual clothing controller further includes user recognition logic to identify a user.

Example 5

This example includes the elements of example 1, wherein the contextual clothing controller is to command a storage system controller to position the identified clothing article in proximity to a user.

Example 6

The example includes the elements according to any one of examples 1 through 5, wherein the contextual clothing controller further includes at least one user profile, each user profile including user profile data corresponding to a respective user.

Example 7

The example includes the elements according to any one of examples 1 through 5, wherein the clothing selection logic is further to update a user profile based, at least in part, on whether or not the identified article was selected.

Example 8

This example includes the elements of example 3, wherein the contextual data includes one or more of environmental data, a calendar, and/or a recommendation from an intelligent personal digital assistant, the environmental data including a season, a weather forecast and a geographic location and the user profile data includes one or more of user-specific data and/or historical data related to past clothing selections, the user-specific data including at least one of an age of a user and sex of the user.

Example 9

The example includes the elements according to any one of examples 1 through 5, wherein the predicted target clothing characteristic is selected from a group of clothing characteristics, the group including article type, article kind, fabric weight, fabric type, season and wear history.

Example 10

This example includes the elements of example 9, wherein the article type is selected from the group including blouse, shirt, pants, trousers, skirt, shorts, dress, outerwear and underwear.

Example 11

This example includes the elements of example 9, wherein the article kind is selected from the group including casual wear, leisure wear, evening wear, business attire, dress wear, work wear and formal wear.

Example 12

This example includes the elements of example 9, wherein at least one of the fabric weight is selected from the group including lightweight, medium weight and heavyweight and/or the fabric type is selected from the group including a natural fabric material and a synthetic fabric material.

Example 13

The example includes the elements according to any one of examples 1 through 5, further including a sensor, the sensor to detect at least one of a presence and/or a position of the identified clothing article.

Example 14

The example includes the elements according to any one of examples 1 through 53, wherein the sensor is further to identify each clothing article stored by a storage unit.

Example 15

The example includes the elements according to any one of examples 1 through 53, wherein the sensor is selected from the group including an RFID (radio frequency identifier) reader, a pressure sensor, a camera and a light emitting diode and a photodetector.

Example 16

The example includes the elements according to any one of examples 1 through 54, wherein each clothing article includes a respective article identifier (ID).

Example 17

The example includes the elements according to any one of examples 1 through 56, wherein the article ID is a radio frequency identifier (RFID) tag.

Example 18

The example includes the elements according to any one of examples 1 through 5, wherein the contextual clothing controller includes a processor and a communication interface.

Example 19

The example includes the elements according to any one of examples 1 through 58, wherein the processor is selected from the group including a microprocessor, a microcontroller, an application specific integrated circuit and an application specific instruction processor.

Example 20

The example includes the elements according to any one of examples 1 through 58, wherein the communication interface is to couple the contextual clothing controller to one or more of an environment data source, one or more user devices, a cloud service and/or a storage system controller.

Example 21

The example includes the elements according to any one of examples 1 through 5, wherein the contextual clothing controller includes a user interface.

Example 22

This example includes the elements of example 21, wherein the user interface is to be used for manual operations.

Example 23

This example includes the elements of example 20, wherein the environment data source is selected from the group including a web service, a weather app and a home automation system.

Example 24

This example includes the elements of example 20, wherein the environmental data is selected from the group including a weather forecast, a temperature or and a humidity.

Example 25

This example includes the elements of example 20, wherein the user device is selected from the group including a smart phone, a wearable device, a computing system, a workstation computer, a desktop computer, a laptop computer, a tablet computer, an ultraportable computer, an ultra-mobile computer, a netbook computer.

Example 26

This example includes the elements of example 20, wherein the user device is to store one or more of a calendar, a social network app and a weather app.

Example 27

This example includes the elements of example 2, wherein the predictor logic is to execute on a cloud service.

Example 28

This example includes the elements of example 4, wherein the user recognition logic is to identify the user based, at least in part, on a user identifier.

Example 29

This example includes the elements of example 28, the user identifier is selected from the group including proximity of a user device, a facial feature, a voice feature, a fingerprint, a retina scan, and an electrophysiological characteristic.

Example 30

This example includes the elements of example 3, wherein the contextual clothing controller is further to capture the contextual data.

Example 31

This example includes the elements of example 2, wherein the predictor logic is to implement a machine learning technique to predict the target clothing characteristic.

Example 32

This example includes the elements of example 31, wherein the machine learning technique is selected from the group including decision tree learning, association rule learning, artificial neural networks, inductive logic programming, support vector machines, clustering, Bayesian networks, reinforcement learning, representation learning and similarity in metric learning.

Example 33

The example includes the elements according to any one of examples 1 through 5, wherein the identified clothing article is identified based, at least in part, on clothing inventory data.

Example 34

This example includes the elements of example 33, wherein the clothing inventory data includes clothing characteristic data indexed by clothing article identifiers.

Example 35

This example includes the elements of example 34, wherein the clothing inventory data includes location information.

Example 36

The example includes the elements according to any one of examples 1 through 5, wherein the clothing selection logic is further to monitor whether or not the identified clothing article is selected by a user.

Example 37

This example includes the elements of example 36, wherein the clothing selection logic is further to provide a query to at least one of a user device and/or a user interface, if the identified clothing article is not selected by the user.

Example 38

This example includes the elements of example 37, wherein the query is to provide the user an option to manually select a desired clothing article or to repeat a contextual clothing selection.

Example 39

According to this example there is provided a method. The method includes identifying, by clothing selection logic, a clothing article based, at least in part, on a predicted target clothing characteristic and determining, by the clothing selection logic, a location of the identified clothing article in a storage system.

Example 40

This example includes the elements of example 8, further including predicting, by predictor logic, the target clothing characteristic.

Example 41

This example includes the elements of example 8, wherein at least one of the predicted target clothing characteristic is predicted based, at least in part, on contextual data and/or the predicted target clothing characteristic is predicted based, at least in part, on user profile data.

Example 42

This example includes the elements of example 8, further including identifying, by user recognition logic, a user.

Example 43

This example includes the elements of example 8, further including commanding, by the contextual clothing controller, a storage system controller to position the identified clothing article in proximity to a user.

Example 44

This example includes the elements of example 8, wherein the contextual clothing controller further includes at least one user profile, each user profile including user profile data corresponding to a respective user.

Example 45

This example includes the elements of example 8, further including updating, by the clothing selection logic, a user profile based, at least in part, on whether or not the identified article was selected.

Example 46

This example includes the elements of example 10, wherein the contextual data includes one or more of environmental data, a calendar, and/or a recommendation from an intelligent personal digital assistant, the environmental data including a season, a weather forecast and a geographic location and the user profile data includes one or more of user-specific data and/or historical data related to past clothing selections, the user-specific data including at least one of an age of a user and sex of the user.

Example 47

This example includes the elements of example 39, wherein the predicted target clothing characteristic is selected from a group of clothing characteristics, the group including article type, article kind, fabric weight, fabric type, season and wear history.

Example 48

This example includes the elements of example 47, wherein the article type is selected from the group including blouse, shirt, pants, trousers, skirt, shorts, dress, outerwear and underwear.

Example 49

This example includes the elements of example 47, wherein the article kind is selected from the group including casual wear, leisure wear, evening wear, business attire, dress wear, work wear and formal wear.

Example 50

This example includes the elements of example 47, wherein at least one of the fabric weight is selected from the group including lightweight, medium weight and heavyweight and/or the fabric type is selected from the group including a natural fabric material and a synthetic fabric material.

Example 51

This example includes the elements of example 39, further including detecting, by a sensor, at least one of a presence and/or a position of the identified clothing article.

Example 52

This example includes the elements of example 51, further including identifying, by the sensor, each clothing article stored by a storage unit.

Example 53

This example includes the elements of example 51, wherein the sensor is selected from the group including an RFID (radio frequency identifier) reader, a pressure sensor, a camera and a light emitting diode and a photodetector.

Example 54

This example includes the elements of example 52, wherein each clothing article includes a respective article identifier (ID).

Example 55

This example includes the elements of example 54, wherein the article ID is a radio frequency identifier (RFID) tag.

Example 56

This example includes the elements of example 39, wherein the contextual clothing controller includes a processor and a communication interface.

Example 57

This example includes the elements of example 56, wherein the processor is selected from the group including a microprocessor, a microcontroller, an application specific integrated circuit and an application specific instruction processor.

Example 58

This example includes the elements of example 56, further including coupling, by the communication interface, the contextual clothing controller to one or more of an environment data source, one or more user devices, a cloud service and/or a storage system controller.

Example 59

This example includes the elements of example 39, wherein the contextual clothing controller includes a user interface.

Example 60

This example includes the elements of example 59, wherein the user interface is to be used for manual operations.

Example 61

This example includes the elements of example 58, wherein the environment data source is selected from the group including a web service, a weather app and a home automation system.

Example 62

This example includes the elements of example 58, wherein the environmental data is selected from the group including a weather forecast, a temperature or and a humidity.

Example 63

This example includes the elements of example 58, wherein the user device is selected from the group including a smart phone, a wearable device, a computing system, a workstation computer, a desktop computer, a laptop computer, a tablet computer, an ultraportable computer, an ultra-mobile computer, a netbook computer.

Example 64

This example includes the elements of example 58, further including storing, by the user device, one or more of a calendar, a social network app and a weather app.

Example 65

This example includes the elements of example 40, wherein the predictor logic is configured to execute on a cloud service.

Example 66

This example includes the elements of example 42, further including identifying, by the user recognition logic, the user based, at least in part, on a user identifier.

Example 67

This example includes the elements of example 66, the user identifier is selected from the group including proximity of a user device, a facial feature, a voice feature, a fingerprint, a retina scan, and an electrophysiological characteristic.

Example 68

This example includes the elements of example 41, further including capturing, by the contextual clothing controller, the contextual data.

Example 69

This example includes the elements of example 40, further including implementing, by the predictor logic, a machine learning technique to predict the target clothing characteristic.

Example 70

This example includes the elements of example 69, wherein the machine learning technique is selected from the group including decision tree learning, association rule learning, artificial neural networks, inductive logic programming, support vector machines, clustering, Bayesian networks, reinforcement learning, representation learning and similarity in metric learning.

Example 71

This example includes the elements of example 39, wherein the identified clothing article is identified based, at least in part, on clothing inventory data.

Example 72

This example includes the elements of example 71, wherein the clothing inventory data includes clothing characteristic data indexed by clothing article identifiers.

Example 73

This example includes the elements of example 72, wherein the clothing inventory data includes location information.

Example 74

This example includes the elements of example 39, further including monitoring, by the clothing selection logic, whether or not the identified clothing article is selected by a user.

Example 75

This example includes the elements of example 74, further including providing, by the clothing selection logic, a query to at least one of a user device and/or a user interface, if the identified clothing article is not selected by the user.

Example 76

This example includes the elements of example 75, wherein the query is to provide the user an option to manually select a desired clothing article or to repeat a contextual clothing selection.

Example 77

A computer readable storage device having stored thereon instructions that when executed by one or more processors result in the following operations including: identifying a clothing article based, at least in part, on a predicted target clothing characteristic; and determining a location of the identified clothing article in a storage system.

Example 78

This example includes the elements of example 77, wherein the instructions that when executed by one or more processors results in the following additional operations including predicting the target clothing characteristic.

Example 79

This example includes the elements of example 77, wherein at least one of the predicted target clothing characteristic is predicted based, at least in part, on contextual data and/or the predicted target clothing characteristic is predicted based, at least in part, on user profile data.

Example 80

This example includes the elements of example 77, wherein the instructions that when executed by one or more processors results in the following additional operations including identifying a user.

Example 81

This example includes the elements of example 77, wherein the instructions that when executed by one or more processors results in the following additional operations including commanding a storage system controller to position the identified clothing article in proximity to a user.

Example 82

This example includes the elements according to any one of examples 77 through 81, wherein the instructions that when executed by one or more processors results in the following additional operations including updating a user profile based, at least in part, on whether or not the identified article was selected.

Example 83

This example includes the elements of example 79, wherein the contextual data includes one or more of environmental data, a calendar, and/or a recommendation from an intelligent personal digital assistant, the environmental data including a season, a weather forecast and a geographic location and the user profile data includes one or more of user-specific data and/or historical data related to past clothing selections, the user-specific data including at least one of an age of a user and sex of the user.

Example 84

This example includes the elements according to any one of examples 77 through 81, wherein the predicted target clothing characteristic is selected from a group of clothing characteristics, the group including article type, article kind, fabric weight, fabric type, season and wear history.

Example 85

This example includes the elements of example 84, wherein the article type is selected from the group including blouse, shirt, pants, trousers, skirt, shorts, dress, outerwear and underwear.

Example 86

This example includes the elements of example 84, wherein the article kind is selected from the group including casual wear, leisure wear, evening wear, business attire, dress wear, work wear and formal wear.

Example 87

This example includes the elements of example 84, wherein at least one of the fabric weight is selected from the group including lightweight, medium weight and heavyweight and/or the fabric type is selected from the group including a natural fabric material and a synthetic fabric material.

Example 88

This example includes the elements according to any one of examples 77 through 81, wherein the instructions that when executed by one or more processors results in the following additional operations including detecting at least one of a presence and/or a position of the identified clothing article.

Example 89

This example includes the elements of example 88, wherein the instructions that when executed by one or more processors results in the following additional operations including identifying each clothing article stored by a storage unit.

Example 90

This example includes the elements of example 88, wherein the sensor is selected from the group including an RFID (radio frequency identifier) reader, a pressure sensor, a camera and a light emitting diode and a photodetector.

Example 91

This example includes the elements of example 89, wherein each clothing article includes a respective article identifier (ID).

Example 92

This example includes the elements of example 91, wherein the article ID is a radio frequency identifier (RFID) tag.

Example 93

This example includes the elements according to any one of examples 77 through 81, wherein the contextual clothing controller includes a processor and a communication interface.

Example 94

This example includes the elements of example 93, wherein the processor is selected from the group including a microprocessor, a microcontroller, an application specific integrated circuit and an application specific instruction processor.

Example 95

This example includes the elements of example 93, wherein the instructions that when executed by one or more processors results in the following additional operations including coupling the contextual clothing controller to one or more of an environment data source, one or more user devices, a cloud service and/or a storage system controller.

Example 96

This example includes the elements according to any one of examples 77 through 81, wherein the contextual clothing controller includes a user interface.

Example 97

This example includes the elements of example 96, wherein the user interface is to be used for manual operations.

Example 98

This example includes the elements of example 95, wherein the environment data source is selected from the group including a web service, a weather app and a home automation system.

Example 99

This example includes the elements of example 95, wherein the environmental data is selected from the group including a weather forecast, a temperature or and a humidity.

Example 100

This example includes the elements of example 95, wherein the user device is selected from the group including a smart phone, a wearable device, a computing system, a workstation computer, a desktop computer, a laptop computer, a tablet computer, an ultraportable computer, an ultra-mobile computer, a netbook computer.

Example 101

This example includes the elements of example 95, wherein the instructions that when executed by one or more processors results in the following additional operations including storing one or more of a calendar, a social network app and a weather app.

Example 102

This example includes the elements of example 78, wherein the predictor logic is configured to execute on a cloud service.

Example 103

This example includes the elements of example 80, wherein the instructions that when executed by one or more processors results in the following additional operations including identifying the user based, at least in part, on a user identifier.

Example 104

This example includes the elements of example 103, the user identifier is selected from the group including proximity of a user device, a facial feature, a voice feature, a fingerprint, a retina scan, and an electrophysiological characteristic.

Example 105

This example includes the elements of example 79, wherein the instructions that when executed by one or more processors results in the following additional operations including capturing the contextual data.

Example 106

This example includes the elements of example 78, wherein the instructions that when executed by one or more processors results in the following additional operations including implementing a machine learning technique to predict the target clothing characteristic.

Example 107

This example includes the elements of example 106, wherein the machine learning technique is selected from the group including decision tree learning, association rule learning, artificial neural networks, inductive logic programming, support vector machines, clustering, Bayesian networks, reinforcement learning, representation learning and similarity in metric learning.

Example 108

This example includes the elements according to any one of examples 77 through 81, wherein the identified clothing article is identified based, at least in part, on clothing inventory data.

Example 109

This example includes the elements of example 108, wherein the clothing inventory data includes clothing characteristic data indexed by clothing article identifiers.

Example 110

This example includes the elements of example 109, wherein the clothing inventory data includes location information.

Example 111

This example includes the elements according to any one of examples 77 through 81, wherein the instructions that when executed by one or more processors results in the following additional operations including monitoring whether or not the identified clothing article is selected by a user.

Example 112

This example includes the elements of example 111, wherein the instructions that when executed by one or more processors results in the following additional operations including providing a query to at least one of a user device and/or a user interface, if the identified clothing article is not selected by the user.

Example 113

This example includes the elements of example 112, wherein the query is to provide the user an option to manually select a desired clothing article or to repeat a contextual clothing selection.

Example 114

According to this example there is provided a device. The device includes means for identifying, by clothing selection logic, a clothing article based, at least in part, on a predicted target clothing characteristic; and means for determining, by the clothing selection logic, a location of the identified clothing article in a storage system.

Example 115

This example includes the elements of example 114, further including means for predicting, by predictor logic, the target clothing characteristic.

Example 116

This example includes the elements of example 114, wherein at least one of the predicted target clothing characteristic is predicted based, at least in part, on contextual data and/or the predicted target clothing characteristic is predicted based, at least in part, on user profile data.

Example 117

This example includes the elements of example 114, further including means for identifying, by user recognition logic, a user.

Example 118

This example includes the elements of example 114, further including means for commanding, by the contextual clothing controller, a storage system controller to position the identified clothing article in proximity to a user.

Example 119

This example includes the elements according to any one of examples 114 through 118, wherein the contextual clothing controller further includes at least one user profile, each user profile including user profile data corresponding to a respective user.

Example 120

This example includes the elements according to any one of examples 114 through 118, further including means for updating, by the clothing selection logic, a user profile based, at least in part, on whether or not the identified article was selected.

Example 121

This example includes the elements of example 116, wherein the contextual data includes one or more of environmental data, a calendar, and/or a recommendation from an intelligent personal digital assistant, the environmental data including a season, a weather forecast and a geographic location and the user profile data includes one or more of user-specific data and/or historical data related to past clothing selections, the user-specific data including at least one of an age of a user and sex of the user.

Example 122

This example includes the elements according to any one of examples 114 through 118, wherein the predicted target clothing characteristic is selected from a group of clothing characteristics, the group including article type, article kind, fabric weight, fabric type, season and wear history.

Example 123

This example includes the elements of example 122, wherein the article type is selected from the group including blouse, shirt, pants, trousers, skirt, shorts, dress, outerwear and underwear.

Example 124

This example includes the elements of example 122, wherein the article kind is selected from the group including casual wear, leisure wear, evening wear, business attire, dress wear, work wear and formal wear.

Example 125

This example includes the elements of example 122, wherein at least one of the fabric weight is selected from the group including lightweight, medium weight and heavyweight and/or the fabric type is selected from the group including a natural fabric material and a synthetic fabric material.

Example 126

This example includes the elements according to any one of examples 114 through 118, further including means for detecting, by a sensor, at least one of a presence and/or a position of the identified clothing article.

Example 127

This example includes the elements of example 126, further including means for identifying, by the sensor, each clothing article stored by a storage unit.

Example 128

This example includes the elements of example 126, wherein the sensor is selected from the group including an RFID (radio frequency identifier) reader, a pressure sensor, a camera and a light emitting diode and a photodetector.

Example 129

This example includes the elements of example 127, wherein each clothing article includes a respective article identifier (ID).

Example 130

This example includes the elements of example 129, wherein the article ID is a radio frequency identifier (RFID) tag.

Example 131

This example includes the elements according to any one of examples 114 through 118, wherein the contextual clothing controller includes a processor and a communication interface.

Example 132

This example includes the elements of example 131, wherein the processor is selected from the group including a microprocessor, a microcontroller, an application specific integrated circuit and an application specific instruction processor.

Example 133

This example includes the elements of example 131, further including means for coupling, by the communication interface, the contextual clothing controller to one or more of an environment data source, one or more user devices, a cloud service and/or a storage system controller.

Example 134

This example includes the elements according to any one of examples 114 through 118, wherein the contextual clothing controller includes a user interface.

Example 135

This example includes the elements of example 134, wherein the user interface is to be used for manual operations.

Example 136

This example includes the elements of example 133, wherein the environment data source is selected from the group including a web service, a weather app and a home automation system.

Example 137

This example includes the elements of example 133, wherein the environmental data is selected from the group including a weather forecast, a temperature or and a humidity.

Example 138

This example includes the elements of example 133, wherein the user device is selected from the group including a smart phone, a wearable device, a computing system, a workstation computer, a desktop computer, a laptop computer, a tablet computer, an ultraportable computer, an ultra-mobile computer, a netbook computer.

Example 139

This example includes the elements of example 133, further including means for storing, by the user device, one or more of a calendar, a social network app and a weather app.

Example 140

This example includes the elements of example 115, wherein the predictor logic is configured to execute on a cloud service.

Example 141

This example includes the elements of example 117, further including means for identifying, by the user recognition logic, the user based, at least in part, on a user identifier.

Example 142

This example includes the elements of example 141, the user identifier is selected from the group including proximity of a user device, a facial feature, a voice feature, a fingerprint, a retina scan, and an electrophysiological characteristic.

Example 143

This example includes the elements of example 116, further including means for capturing, by the contextual clothing controller, the contextual data.

Example 144

This example includes the elements of example 115, further including means for implementing, by the predictor logic, a machine learning technique to predict the target clothing characteristic.

Example 145

This example includes the elements of example 144, wherein the machine learning technique is selected from the group including decision tree learning, association rule learning, artificial neural networks, inductive logic programming, support vector machines, clustering, Bayesian networks, reinforcement learning, representation learning and similarity in metric learning.

Example 146

This example includes the elements according to any one of examples 114 through 118, wherein the identified clothing article is identified based, at least in part, on clothing inventory data.

Example 147

This example includes the elements of example 146, wherein the clothing inventory data includes clothing characteristic data indexed by clothing article identifiers.

Example 148

This example includes the elements of example 147, wherein the clothing inventory data includes location information.

Example 149

This example includes the elements according to any one of examples 114 through 118, further including means for monitoring, by the clothing selection logic, whether or not the identified clothing article is selected by a user.

Example 150

This example includes the elements of example 149, further including means for providing, by the clothing selection logic, a query to at least one of a user device and/or a user interface, if the identified clothing article is not selected by the user.

Example 151

This example includes the elements of example 150, wherein the query is to provide the user an option to manually select a desired clothing article or to repeat a contextual clothing selection.

Example 152

According to this example there is provided a system. The system includes a storage system and a contextual clothing controller. The storage system includes a storage system controller, an actuator and at least one sensor. The contextual clothing controller includes clothing selection logic to identify a clothing article based, at least in part, on a predicted target clothing characteristic and to determine a location of the identified clothing article in the storage system.

Example 153

This example includes the elements of example 152, wherein the contextual clothing controller further includes predictor logic, the predictor logic to predict the target clothing characteristic.

Example 154

This example includes the elements of example 152, wherein at least one of the predicted target clothing characteristic is predicted based, at least in part, on contextual data and/or the predicted target clothing characteristic is predicted based, at least in part, on user profile data.

Example 155

This example includes the elements of example 152, wherein the contextual clothing controller further includes user recognition logic to identify a user.

Example 156

This example includes the elements of example 152, wherein the contextual clothing controller is to command a storage system controller to position the identified clothing article in proximity to a user.

Example 157

This example includes the elements according to any one of examples 152 through 156, wherein the contextual clothing controller further includes at least one user profile, each user profile including user profile data corresponding to a respective user.

Example 158

This example includes the elements according to any one of examples 152 through 156, wherein the clothing selection logic is further to update a user profile based, at least in part, on whether or not the identified article was selected.

Example 159

This example includes the elements of example 154, wherein the contextual data includes one or more of environmental data, a calendar, and/or a recommendation from an intelligent personal digital assistant, the environmental data including a season, a weather forecast and a geographic location and the user profile data includes one or more of user-specific data and/or historical data related to past clothing selections, the user-specific data including at least one of an age of a user and sex of the user.

Example 160

This example includes the elements according to any one of examples 152 through 156, wherein the predicted target clothing characteristic is selected from a group of clothing characteristics, the group including article type, article kind, fabric weight, fabric type, season and wear history.

Example 161

This example includes the elements of example 160, wherein the article type is selected from the group including blouse, shirt, pants, trousers, skirt, shorts, dress, outerwear and underwear.

Example 162

This example includes the elements of example 160, wherein the article kind is selected from the group including casual wear, leisure wear, evening wear, business attire, dress wear, work wear and formal wear.

Example 163

This example includes the elements of example 160, wherein at least one of the fabric weight is selected from the group including lightweight, medium weight and heavyweight and/or the fabric type is selected from the group including a natural fabric material and a synthetic fabric material.

Example 164

This example includes the elements according to any one of examples 152 through 156, further including a sensor, the sensor to detect at least one of a presence and/or a position of the identified clothing article.

Example 165

This example includes the elements of example 164, wherein the sensor is further to identify each clothing article stored by a storage unit.

Example 166

This example includes the elements of example 164, wherein the sensor is selected from the group including an RFID (radio frequency identifier) reader, a pressure sensor, a camera and a light emitting diode and a photodetector.

Example 167

This example includes the elements of example 165, wherein each clothing article includes a respective article identifier (ID).

Example 168

This example includes the elements of example 167, wherein the article ID is a radio frequency identifier (RFID) tag.

Example 169

This example includes the elements according to any one of examples 152 through 156, wherein the contextual clothing controller includes a processor and a communication interface.

Example 170

This example includes the elements of example 169, wherein the processor is selected from the group including a microprocessor, a microcontroller, an application specific integrated circuit and an application specific instruction processor.

Example 171

This example includes the elements of example 169, wherein the communication interface is to couple the contextual clothing controller to one or more of an environment data source, one or more user devices, a cloud service and/or a storage system controller.

Example 172

This example includes the elements according to any one of examples 152 through 156, wherein the contextual clothing controller includes a user interface.

Example 173

This example includes the elements of example 172, wherein the user interface is to be used for manual operations.

Example 174

This example includes the elements of example 171, wherein the environment data source is selected from the group including a web service, a weather app and a home automation system.

Example 175

This example includes the elements of example 171, wherein the environmental data is selected from the group including a weather forecast, a temperature or and a humidity.

Example 176

This example includes the elements of example 171, wherein the user device is selected from the group including a smart phone, a wearable device, a computing system, a workstation computer, a desktop computer, a laptop computer, a tablet computer, an ultraportable computer, an ultra-mobile computer, a netbook computer.

Example 177

This example includes the elements of example 171, wherein the user device is to store one or more of a calendar, a social network app and a weather app.

Example 178

This example includes the elements of example 153, wherein the predictor logic is to execute on a cloud service.

Example 179

This example includes the elements of example 155, wherein the user recognition logic is to identify the user based, at least in part, on a user identifier.

Example 180

This example includes the elements of example 179, the user identifier is selected from the group including proximity of a user device, a facial feature, a voice feature, a fingerprint, a retina scan, and an electrophysiological characteristic.

Example 181

This example includes the elements of example 154, wherein the contextual clothing controller is further to capture the contextual data.

Example 182

This example includes the elements of example 153, wherein the predictor logic is to implement a machine learning technique to predict the target clothing characteristic.

Example 183

This example includes the elements of example 182, wherein the machine learning technique is selected from the group including decision tree learning, association rule learning, artificial neural networks, inductive logic programming, support vector machines, clustering, Bayesian networks, reinforcement learning, representation learning and similarity in metric learning.

Example 184

This example includes the elements according to any one of examples 152 through 156, wherein the identified clothing article is identified based, at least in part, on clothing inventory data.

Example 185

This example includes the elements of example 184, wherein the clothing inventory data includes clothing characteristic data indexed by clothing article identifiers.

Example 186

This example includes the elements of example 185, wherein the clothing inventory data includes location information.

Example 187

This example includes the elements according to any one of examples 152 through 156, wherein the clothing selection logic is further to monitor whether or not the identified clothing article is selected by a user.

Example 188

This example includes the elements of example 187, wherein the clothing selection logic is further to provide a query to at least one of a user device and/or a user interface, if the identified clothing article is not selected by the user.

Example 189

This example includes the elements of example 188, wherein the query is to provide the user an option to manually select a desired clothing article or to repeat a contextual clothing selection.

Example 190

A system including at least one device arranged to perform the method of any one of examples 39 to 76.

Example 191

A device including means to perform the method of any one of examples 39 to 76.

Example 192

A computer readable storage device having stored thereon instructions that when executed by one or more processors result in the following operations including: the method according to any one of examples 39 to 76.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
    a contextual clothing controller comprising:
        clothing selection logic to identify a clothing article based, at least in part, on a predicted target clothing characteristic and to determine a location of the identified clothing article in a storage system;
        at least one user profile containing a history of past clothing selections by a user corresponding to said at least one user profile; and
        predictor logic, wherein the predictor logic is to implement a machine learning technique to generate the predicted target clothing characteristic based at least in part on said history of past clothing selections;
        wherein the clothing selection logic is further configured to monitor whether the identified clothing article was selected by a user corresponding to said user profile data, and to update the history of past clothing selections based on a result of said monitoring.

2. The apparatus of claim 1, wherein the predictor logic is further configured to generate the predicted target clothing characteristic based at least in part on contextual data.

3. The apparatus of claim 1, wherein the contextual clothing controller further comprises user recognition logic to identify said user.

4. The apparatus of claim 1, wherein the contextual clothing controller is to command a storage system controller to position the identified clothing article in proximity to said user.

5. A method comprising:
    generating, with predictor logic of clothing selection logic, a predicted target clothing characteristic based at least in part on a history of past clothing selections in user profile data, said generating comprising performing a machine learning technique based at least in part on said history of past clothing selections to determine said predicted target clothing characteristic;
    identifying, by said clothing selection logic, a clothing article based, at least in part, on said predicted target clothing characteristic;
    determining, by the clothing selection logic, a location of the identified clothing article in a storage system;
    monitoring, by said clothing selection logic, whether the identified clothing article was selected by a user corresponding to said user profile data; and
    updating, with the clothing selection logic, the history of past clothing selections based on a result of said monitoring.

6. The method of claim 5, further comprising identifying, by user recognition logic, said user.

7. The method of claim 5, further comprising commanding, by the contextual clothing controller, a storage system controller to position the identified clothing article in proximity to said user.

8. The method of claim 5, wherein said generating further comprises, determining, with said predictor logic, said predicted target clothing characteristic based at least in part on contextual data.

9. The method of claim 8, wherein the contextual data comprises one or more of environmental data, a calendar, and/or a recommendation from an intelligent personal digital assistant, the environmental data comprising a season, a weather forecast and a geographic location and the user profile data further comprises user-specific data comprising at least one of an age of a user and sex of the user.

10. A computer readable storage device having stored thereon instructions that when executed by one or more processors result in the following operations comprising:

generating a predicted target clothing characteristic based at least in part on a history of past clothing selections in user profile data, said generating comprising performing a machine learning technique based at least in part on said history of past clothing selections to determine said predicted target clothing characteristic;

identifying a clothing article based, at least in part, on the predicted target clothing characteristic;

determining a location of the identified clothing article in a storage system;

monitoring whether the identified clothing article was selected by a user corresponding to said user profile data; and updating the history of past clothing selections based on a result of said monitoring.

11. The device of claim 10, wherein the instructions that when executed by one or more processors results in the following additional operations comprising identifying said user.

12. The device of claim 10, wherein the instructions that when executed by one or more processors results in the following additional operations comprising commanding a storage system controller to position the identified clothing article in proximity to said user.

13. The device of claim 10, said generating further comprises, determining, with said predictor logic, said predicted target clothing characteristic based at least in part on contextual data.

14. The device of claim 13, wherein the contextual data comprises one or more of environmental data, a calendar, and/or a recommendation from an intelligent personal digital assistant, the environmental data comprising a season, a weather forecast and a geographic location and the user profile data comprises user-specific data comprising at least one of an age of a user and sex of the user.

* * * * *